Sept. 21, 1926.   1,600,635
L. ISACHSEN
STEERING DEVICE FOR TRAIL CARS FOR AUTOMOBILES
Filed Oct. 9, 1924
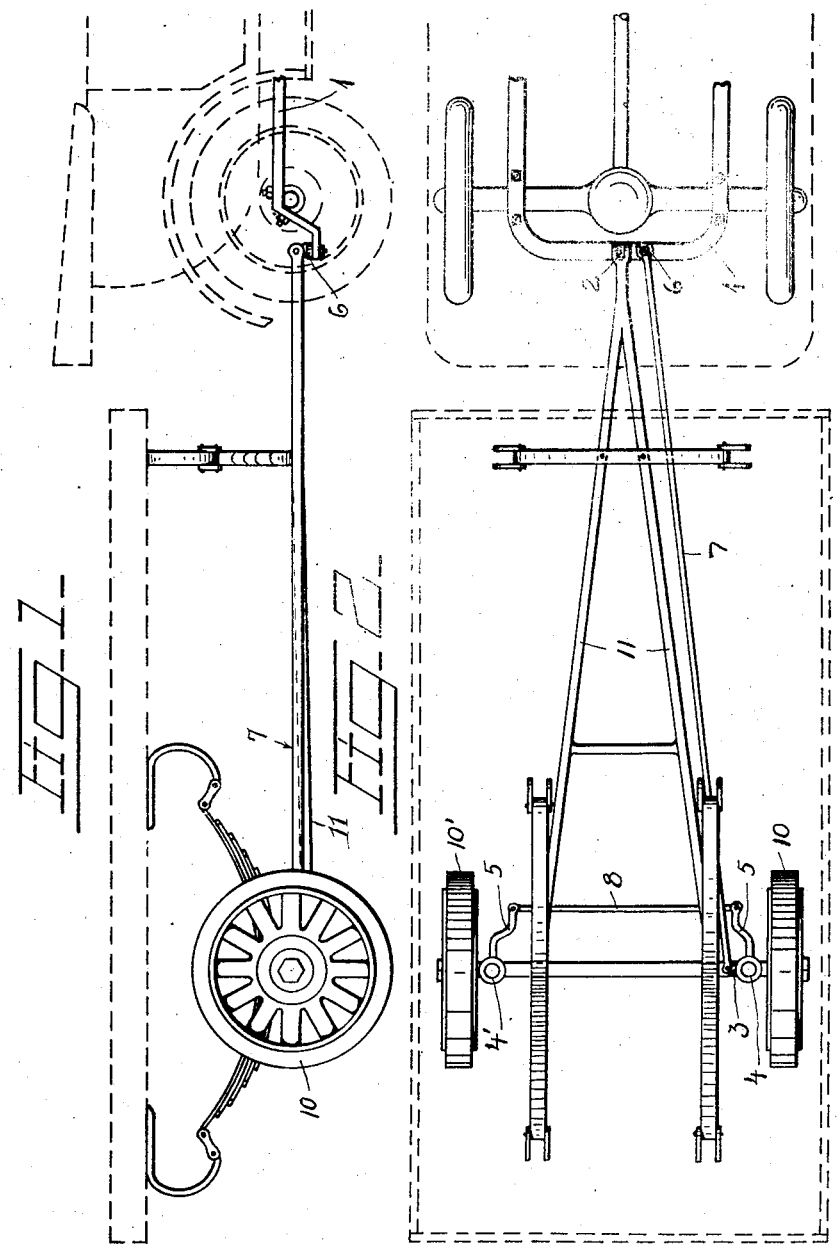
Inventor
L. Isachsen
By Marks & Clerk Patented Sept. 21, 1926.

1,600,635

UNITED STATES PATENT OFFICE.

LUDVIK ISACHSEN, OF LARVIK, NORWAY.

STEERING DEVICE FOR TRAIL CARS FOR AUTOMOBILES.

Application filed October 9, 1924, Serial No. 742,702, and in Norway October 2, 1923.

The present invention relates to a steering device for trail-cars for automobiles and the main object of the invention is to facilitate the use and driving of automobiles when such a trail-car is used.

Another object of the invention is to provide a steering device, which will compel the trail-car to follow the movements of the automobiles in curves and the like in such a manner that the trail-car always will be held within the breadth of the range, which is necessary for the manœuvring of the automobile.

The steering device may be used in connection with two as well as four wheeled trail-cars, and these may, owing to the invention, be easily connected with every automobile.

The annexed drawing shows, by way of example, one form of apparatus embodying my invention.

Fig. 1 is a side elevation of a two wheeled trail-car, and

Fig. 2 is a plan view of the same with the car body removed; the steering device being shown somewhat diagrammatically.

Referring to the drawing 1 is a frame for securing to the body of an automobile or to the rear axle of the same. To the said frame 1 are secured universal joints 2 and 6, which constitute the parts for connecting and disconnecting the trail-car to the automobile. The universal joint 2 is situated at the central line of the automobile and also secured to the frame 11 of the trail-car, and the universal joint 6 is placed in a distance beside the joint 2 and secured to the end of a steering rod 7, the other end of which is pivotally secured to a crank arm 3. The length of the said crank arm is equal to the distance between the joints 2 and 6. The crank arm 3 is secured to the knuckle 4 on the right hand side, which latter through the connecting bar 8 and arms 5 is connected to the other knuckle 4'.

The device acts in the following manner:

When the automobile is being turned, say to the right counting from the direction of driving, so that the rear wheels of the same are taking up an angular position with the longitudinal axis of the trail-car, say 15 degrees, the crank arm 3 is, by means of the steering rod 7, adjusted in such a manner that the steering wheel 10 of the trail-car is turned into a corresponding angular position with the said axis but in the opposite direction, and the movement of the wheel 10 is transmitted correspondingly to the wheel 10' by the arms 5 and the connecting rod 8. By making the lever 3 substantially the same in length as the distance between the pivots 2 and 6, the wheels of the trailer are caused to turn on the same arc as the wheels of the automobile.

Having now particularly described and ascertained the nature of my said invention, and in what manner the same is to be performed, I declare that what I claim is:—

In combination, an automobile, a trail-car including an axle, supporting wheels for said axle, steering knuckles connecting the wheels with the axles, arms carried by the knuckles, means connecting the arms for producing co-relative steering movements of the wheels, a relatively short arm carried by one of the knuckles, draft bars connected with the axle, a universal joint connecting the draft bars with the automobile, and a steering rod directly and pivotally connected at one end with said short arm and a universal joint connecting the opposite end of the steering rod with the automobile, the distance between the universal joint and the length of said arm being substantially the same whereby the wheels of the trail-car turn in the same arc as the wheels of the automobile.

In testimony whereof I have signed my name to this specification.

LUDVIK ISACHSEN.